3,265,567
METHODS AND COMPOSITIONS FOR CONTROL OF MARINE ORGANISMS
James R. Rice and Donnell A. Ballard, Lake Jackson, Tex., assignors to The Dow Chemical Company, Midland, Mich., a corporation of Delaware
No Drawing. Filed Jan. 30, 1963, Ser. No. 255,095
18 Claims. (Cl. 167—38.6)

This invention is concerned with methods and compositions for the control of marine organisms.

It is an object of the present invention to provide a novel method of controlling marine organisms. It is another object of the present invention to provide a novel method for the control of marine organisms of the order Isopoda. It is also an object of the present invention to provide a novel method for the control of Limnoria. A further object of the present invention is to provide a novel method for treating wood. A still further object is the provision of an improved method for the preservation of, and prevention of deterioration of, wood exposed to the attack of marine organisms. Also, it is an object to provide novel compositions adapted to be employed for the practice of the methods of the present invention. Other objects will become apparent from the following specification and claims.

Limnoria, commonly called the true "gribble," is a marine animal of the order Isopoda, and class Crustacea. While sometimes informally called a "worm" or "shipworm" or by some other name, it is in no true sense a worm. The misnomer may arise from the fact that its damage to wood sometimes resembles that caused in wood in aerial or terrestrial exposure by the xylophagous larvae of various insects, which larvae are informally called "worms." The gribble is more nearly related to the crab or lobster than to the worms. It attains an adult size of up to about ¼ inch and has a segmented body with seven pairs of legs and sharp, hooked claws. Respiration is carried on through platelike appendages (gills) the movement of which serves also to propel the animal in a swimming type of movement. The animal has among its mouth parts strong toothed mandibles. It occurs extensively at and just below tidal low water and is active along the entire Atlantic, Pacific, and Gulf coasts of the United States, as well as elsewhere throughout the world. Hence, in the present specification and claims the expression "marine" is used to identify the open sea as well as partially enclosed bays and river mouths and the like wherein salinity of water varies from that of the high seas to merely distinctly brackish.

Because the ability to swim is limited, the animal utilizes its claws to attach itself to wood, and its mandibles to chew the wood to which it attaches, burrowing in to a depth of an inch or more. Frequently enormous numbers of Limnoria attack wood, as, for example, up to 100 organisms per square inch, causing a characteristic broken-up appearance of the surface of the wood. Wood surfaces which have been attacked by such large numbers are greatly weakened and may be removed by the mechanical action of water movement, particularly that of waves, thus exposing to renewed attack a new surface of the wood, lessening the bulk of the wood structure, and increasing the possibility of attack by other marine organisms.

The new method for controlling marine organisms comprises contacting an organism of the genus Limnoria with a limnoricidal amount, that is, a Limnoria-controlling amount, of a compound selected from the group consisting of 5-tert-butyl-2-chlorophenyl methylcarbamate, melting at 120°–122° C. and having the formula

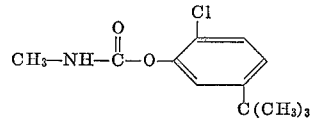

and 3,5-xylyl methylcarbamate, melting at 99°–100.5° C. and having the formula

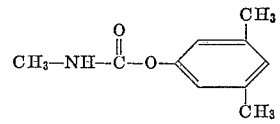

These compounds are solid materials of very low solubility in water and of low to moderate solubility in various organic solvents. For the sake of convenience, each of these compounds is interchangeably referred to throughout the present specification as "carbamate." The terms "controlling" and "control," as employed throughout the present specification and claims, are utilized to describe the killing of, the repelling of, or the preventing of attack by, biological organisms. These terms are never used herein to mean attracting, encouraging or otherwise favoring the growth of biological organisms.

Preferably, the carbamate is employed in a modified form as a composition comprising carbamate and one or more adjuvants. Such adjuvant can be, for example, a surface-active dispersing agent, an inert finely-divided solid, a penetrating carrier vehicle, or a water-resistant binding material.

There are various manners in which contacting of Limnoria with carbamate can be accomplished. The contacting can be effected by treating with carbamate the aqueous media that constitute the habitat of Limnoria. For example, carbamate can be dispersed in the media, conveniently with the aid of a surface-active dispersing agent. Also, carbamate, conveniently in admixture with a penetrating solvent carrier, can be applied to wood for use in the habitat of Limnoria.

Such application to wood, which is preferably made before marine exposure thereof, can be as a paint, dip, spray, bath, or the like, according to procedures known to those skilled in the art. However, when it is desired to obtain more long lasting control of marine organisms, it is preferred to make application under pressure, frequently described as "impregnation," of a composition containing the carbamate and a penetrating carrier vehicle, such as, for example, creosote, coal-tar creosote, oil-tar creosote, coal-tar, creosote-coal-tar mixtures, petroleum oil, creosote-petroleum solutions, or various organic solvents, such as benzene, toluene, dioxane, acetone, and the like.

While the present carbamate compounds are of very low solubility in water, and usually present no serious problem of leaching, the composition can also comprise any of various water-resistant binding materials, which, when the composition has been applied to the wood, will tend to bind the present limnoricidal compounds to the wood and to prevent leaching of carbamate into the liquid media in which the wood is placed. Suitable water-resistant binding materials are those materials which are gummy, near-solid, or solid at room temperature and which are essentially insoluble in water and soluble in at least one organic solvent and include common paraffin waxes, which can be dissolved in hydrocarbon solvents; epoxy resins, which can be dissolved in oxygenated solvents such as lower alkyl ketones and dioxane; phenol-formaldehyde type resins which can be dissolved in various ketones and alcohols; melamine resins of which representatives are similarly soluble; and the so-called "unsaturated polyester" liquids for room temperature cure of which a representative example is a solution in styrene of a medium molecular weight terpolymer of maleic anhydride, phthalic acid and propylene glycol, together with such promoters as cobalt soaps, or dimethylaniline, and a peroxide type catalyst. Various other binding materials include the drying oils, numerous solvent soluble resinous thermoplastic substances, and the like.

The carbamate composition can comprise without, in addition to, or as, penetrating carrier vehicle and/or water-resistant binding vehicle, one or more other marine pest-controlling agents such as a wood preservative which controls, for example, fungal growth, insect attack, or attack of marine organisms other than Limnoria, such as Teredo, or an anti-fouling agent which controls, for example, barnacles and the like. Suitable wood preservatives are by-product oils, such as coal-tar creosote, coal-tar, petroleum oils, wood-tar creosote, oil-tar creosote, mixtures thereof, and the like; and chemicals, such as pentachlorophenol, tetrachlorophenol, copper pentachlorophenate, zinc pentachlorophenate, copper naphthenate, zinc naphthenate, phenyl mercury oleate, and the like. Certain of the wood preservatives to be employed, notably the by-product oils, serve as adjuvant, as penetrating carrier vehicle and/or binding material and because of the combination of properties, their use is preferred. A particularly preferred adjuvant is creosote.

In general, when employing the impregnation procedures, the wood which is to be treated with carbamate in solution, or, optionally together with other substances as indicated above, is placed in a vessel from which the contained atmosphere is evacuated to achieve a subatmospheric pressure, such as from about 5 to about 600 millimeters mercury. Thereafter a mixture comprising carbamate and a penetrating carrier vehicle is introduced into the vessel so as to effect the immersion of the wood therein. Preferably this mixture is at an elevated temperature, for example, from 180° to 200° F. The contents of the vessel can thereafter be placed successively under superatmospheric pressure, such as from about 1.5 to about 100 atmospheres, in some instances more, and under subatmospheric pressure, as previously set forth, for periods of time to facilitate the impregnation of the carbamate solution into the wood. Techniques for facilitating penetration of the solution into the wood, such as incision, debarking, or other preparation of the wood, can be utilized.

The present carbamates are effective in preventing Limnoria attack when employed in paints. These can be paints that, after application, become a firm and hard substance, such as paints based upon alkyd resins, or upon such drying oils as linseed, tung-nut, and like oils. Also, the carbamates successfully control Limnoria attack when incorporated into anti-fouling paints of the types that never become hard but are intended to remain viscous, yielding, and deformable. The carbamates function effectively in the presence or absence of, for example, metal flakes, pigments, volatile oils, and the like.

Also, the carbamate or composition of which the carbamate is an active component can be applied to wood after which the wood can be painted or otherwise treated. While the carbamate itself presents no unusual problem, it is noted that, to make possible painting after treatment with carbamate, solvent, if any, should either be so volatile as to disappear, or be compatible with the paint.

The actual weight of one or both of the carbamates to be employed can vary considerably according to the circumstances in which the carbamate is employed.

When it is desired to control Limnoria by dispersing carbamate in sea water in which Limnoria infestation is usually a problem, good results are obtained when employing from about .01 to about 25 parts carbamate per million parts sea water. Lower concentrations can be employed under such favorable conditions as still water, and relatively high levels of light and temperature. When desired, as under unfavorable conditions, higher concentrations can be employed. Where carbamate is to be applied to wood, good results are obtained when employing the carbamate to provide from about 0.001 to about 10.0, and preferably from about 0.1 to about 2.0, parts carbamate per hundred parts by weight of wood tissue actually impregnated thereby. When only light protection is desired, surface coating or impregnation of an outer zone of wood suffices. This can be accomplished by painting or brief dipping with a carbamate composition. When heavy protection is desired, deeper impregnation, which may be total impregnation, can be used.

When compositions are employed comprising the carbamate and one or more additives such as pest-controlling agents, and, if desired, one or more adjuvants, the amount of carbamate present will depend upon such factors as whether the composition is to be employed as a concentrate composition or as an ultimate treating composition, whether the composition comprises one or a plurality of additives, and the particular identity of the additive or additives employed. In a composition of which the essential components are a carbamate and a wood preservative, the carbamate can be present in an amount of from about 0.5 to about 99.5 percent and the wood preservative can be present in an amount of from about 0.5 to about 99.5 percent, the percentages being based on the weight of ultimate composition. In a composition of which the essential components are a carbamate and a water-resistant binding material, the carbamate can be present in an amount of from about 0.5 to about 99.5 percent and the binding material can be present in an amount of from about 0.5 to about 99.5 percent, the percentages being based on the weight of ultimate composition. In a composition of which the essential components are a carbamate, a wood preservative, and water-resistant binding material, the carbamate can be present in an amount of from about 1.0 to about 80.0 percent, the wood preservative in an amount of from about 2.0 to about 96.0 percent, and the binding material in an amount of from about 1.0 to about 80.0 percent, all percentages being based on the weight of ultimate composition. As hereinbefore particularly set forth, the total percentage of components of any given composition is not in excess of 100 percent.

The following examples illustrate the invention but are not to be construed as limiting.

*Example 1*

5-tert-butyl-2-chlorophenyl methylcarbamate is dispersed in creosote to form a composition containing 4.7 percent carbamate by weight of resulting composition. The composition thus prepared is employed for the treatment of wood to control marine boring organisms.

Specimens of southern yellow pine sapwood of uniform dimension are prepared. Certain of the specimens are treated with creosote only, hereinafter called group B specimens; others are treated with the carbamate composition, as prepared above, hereinafter identified as group A specimens; and others are left untreated to serve as control specimens (group C).

In the treating operations, the wood specimens to be treated are placed one group at a time in a vessel, from which air is evacuated until a subatmospheric pressure of about 10 millimeters absolute is obtained within the vessel. Simultaneously, the treating composition is heated to a temperature of about 180° to 200° F., whereupon the heated treating composition is introduced into the vessel under subatmospheric pressure, thereby restoring to normal atmospheric pressure the interior of the vessel. The wood specimens are permitted to remain for a period of time fully immersed in the treating solution; thereafter the specimens are removed. In this manner, specimens of groups A and B are treated; group C specimens are left untreated.

Specimens of all groups are thereafter exposed to Limnoria attack. Specifically, they are affixed to the earth near the normal low tide line of the sea in a region where Limnoria are prevalent and where exposed untreated wood structures usually suffer prompt and severe damage. The specimens are periodically inspected in situ. Examination of the specimens after two years of exposure shows that specimens of group A are free from attack by any marine borers. Specimens of group B show heavy attacks of Limnoria, while specimens of group C exhibit heavy attack by both Teredo and Limnoria boring organisms. Specimens of both groups B and C are judged to be structurally worthless. Those of group A are judged to be structurally sound.

*Example 2*

In procedures substantially the same as those in Example 1, 3,5-xylyl methylcarbamate is employed for the control of marine boring organisms. Observations indicate essentially identical results.

Each of the carbamates to be employed according to the present invention is prepared in known methods. A particular method which is technically suitable is the condensation of methylisocyanate with appropriately substituted phenol.

We claim:

1. A method which comprises contacting an organism of the genus Limnoria with a limnoria controlling amount of a compound selected from the group consisting of 5-tert-butyl-2-chlorophenyl methylcarbamate and 3,5-xylyl methylcarbamate.

2. A method which comprises applying to wood a compound selected from the group consisting of 5-tert-butyl-2-chlorophenyl methylcarbamate and 3,5-xylyl methylcarbamate in an amount sufficient to make the wood resistant to attack by an organism of the genus Limnoria.

3. A composition comprising a limnoria controlling amount of a compound selected from the group consisting of 5-tert-butyl-2-chlorophenyl methylcarbamate and 3,5-xylyl methylcarbamate, and a wood preservative.

4. A composition of claim 3 wherein the wood preservative is creosote.

5. A composition of claim 3 wherein the wood preservative is coal-tar.

6. A composition of claim 3 wherein the wood preservative is pentachlorophenol.

7. A composition of claim 3 wherein the wood preservative is copper naphthenate.

8. A composition of claim 3 wherein the wood preservative is zinc naphthenate.

9. A composition comprising a wood preservative, a water-resistant binding material and a limnoria controlling amount of a compound selected from the group consisting of 5-tert-butyl-2-chlorophenyl methylcarbamate and 3,5-xylyl methylcarbamate.

10. A composition of claim 9 in which the wood preservative is creosote.

11. A composition of claim 9 in which the wood preservative is coal-tar.

12. A composition of claim 9 in which the wood preservative is pentachlorophenol.

13. A composition of claim 9 in which the wood preservative is copper naphthenate.

14. A composition of claim 9 in which the wood preservative is zinc naphthenate.

15. A composition comprising a limnoria controlling amount of a compound selected from the group consisting of 5-tert-butyl-2-chlorophenyl methylcarbamate and 3,5-xylyl methylcarbamate, and a paint.

16. A composition of claim 15 wherein the paint is an anti-fouling non-drying paint.

17. An article resistant to attack by marine oragnisms which comprises wood impregnated with a by-product oil wood preservative to the extent of from about 5.0 to about 25.0 percent of the weight of the wood and impregnated with a compound selected from the group consisting of 5-tert-butyl-2-chlorophenyl methylcarbamate and 3,5-xylyl methylcarbamate to the extent of from about 0.01 to about 10.0 percent of the weight of the wood.

18. An article of claim 17 wherein the by-product oil wood preservative is creosote.

References Cited by the Examiner

UNITED STATES PATENTS

| 2,494,941 | 1/1950 | Goll | 167—38.6 |
| 2,904,467 | 9/1959 | Behr | 167—38.7 |
| 2,951,786 | 9/1960 | Pullen et al. | 167—30 |
| 3,049,471 | 8/1962 | Behr | 167—38.7 |
| 3,062,865 | 11/1962 | Moore et al. | 167—30 |
| 3,065,087 | 11/1962 | Goldstein et al. | 106—15 |
| 3,065,130 | 11/1962 | Walles | 106—15 |
| 3,076,741 | 2/1963 | Kohn et al. | 167—30 |
| 3,081,175 | 3/1963 | Godfrey et al. | 106—15 |

FOREIGN PATENTS

| 555,686 | 4/1958 | Canada. |

JULIAN S. LEVITT, *Primary Examiner.*

GEORGE A. MENTIS, *Assistant Examiner.*